May 4, 1937.　　　G. R. ECKSTEIN　　　2,079,247
VISCOSIMETER
Filed Nov. 7, 1936　　　2 Sheets-Sheet 1

INVENTOR
George R. Eckstein
BY
John S. Powers
ATTORNEY

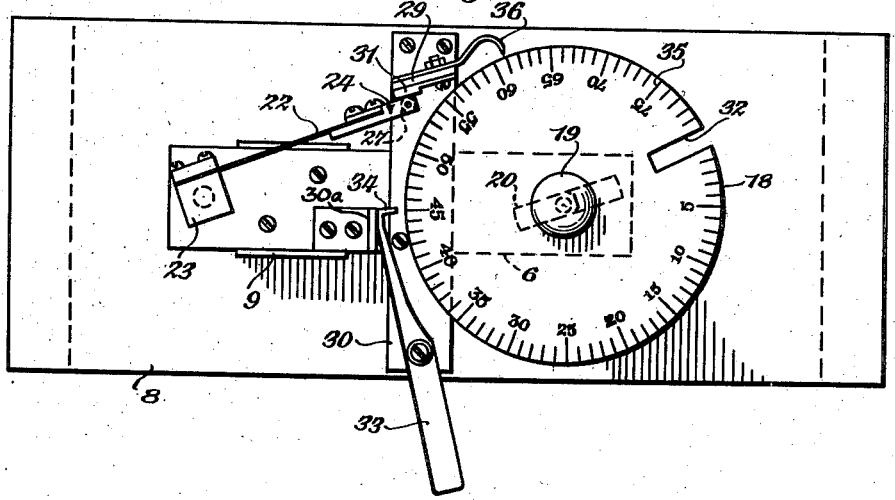
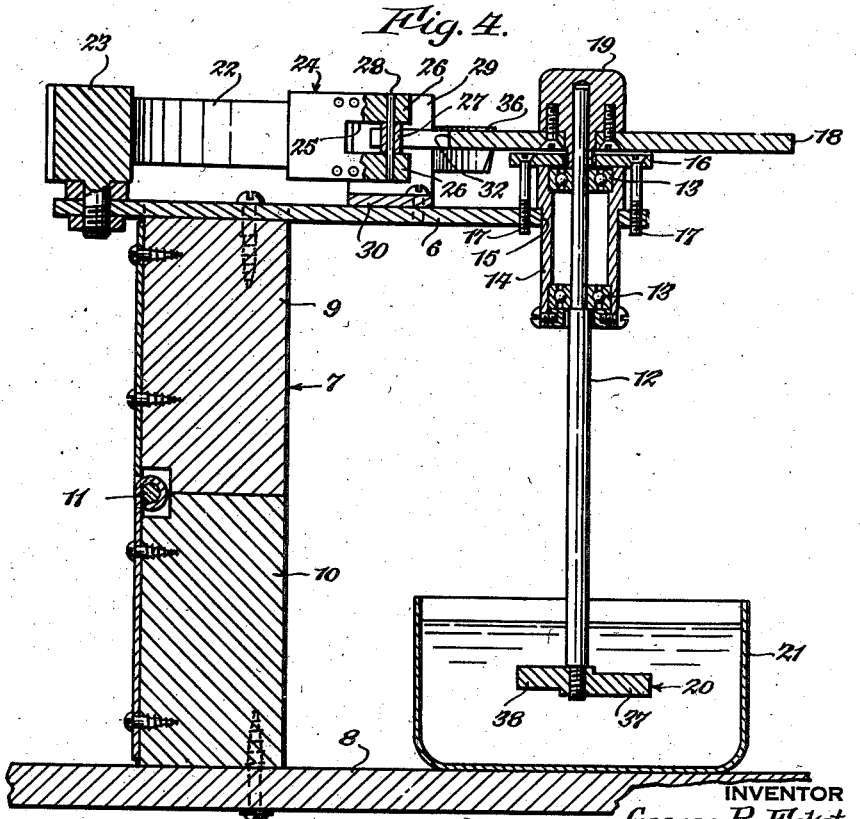

Patented May 4, 1937

2,079,247

UNITED STATES PATENT OFFICE 2,079,247

VISCOSIMETER

George R. Eckstein, Buffalo, N. Y., assignor to Visco Meter Corporation, Buffalo, N. Y.

Application November 7, 1936, Serial No. 109,740

14 Claims. (Cl. 265—11)

This invention relates to a device which, although available for determining the viscosity of various fluids, is characterized by features which adapt it particularly to the testing of liquids of relatively high viscosity such as, for example, melted chocolate, it being understood that chocolate which is to be employed in connection with the coating of candies must be of a predetermined viscosity at a given temperature in order that during the dipping process the layer of chocolate which adheres to the candies will be of the proper thickness.

One object of the invention is to provide a device which is so designed that the viscosity of the fluid can be ascertained accurately and with facility.

A further object is to provide for facility in removing any of the fluid which may adhere to the parts of the device.

A still further object is to provide a device which is so constructed that the testing operations can be performed without effecting a change, that is to any appreciable degree, in the temperature of the fluid.

Figure 1:
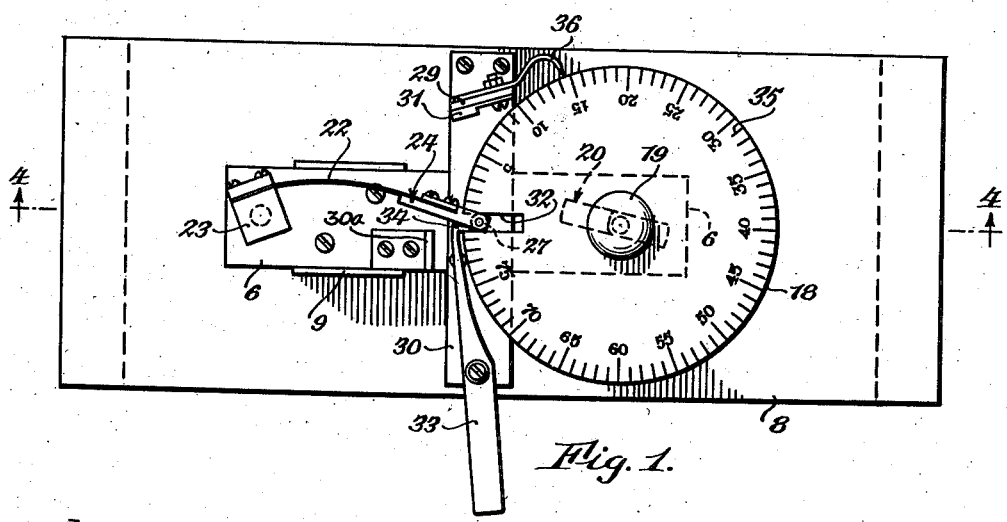

The invention is illustrated in the accompanying drawings in which:

Figure 1 is a top plan view of the device, the parts being shown in the positions they occupy when the device is conditioned for use.

Figure 2:
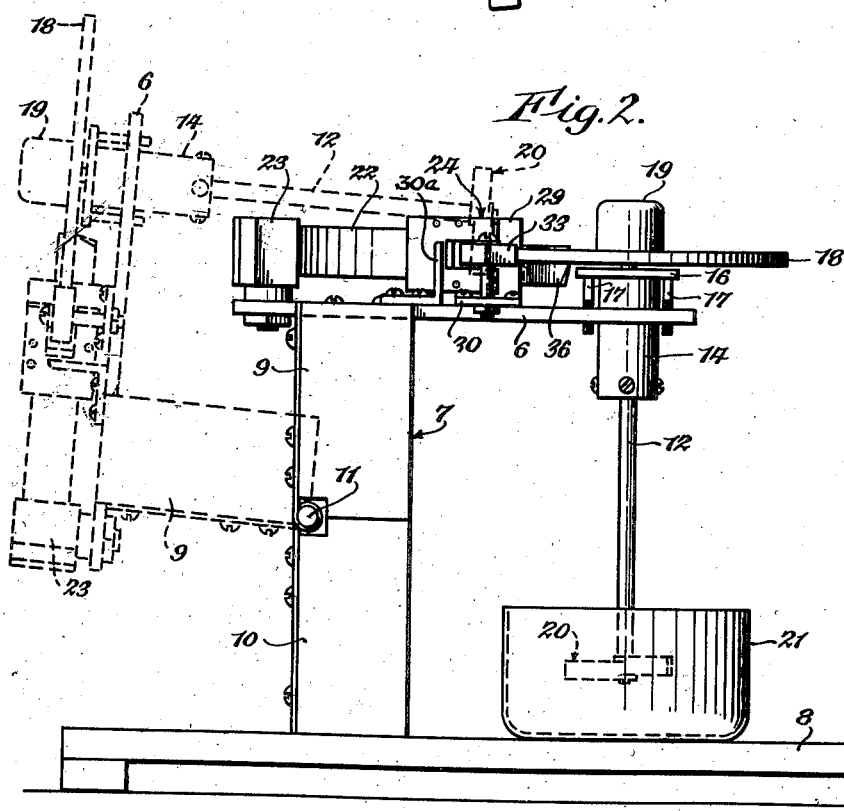

Figure 2 is a side elevation of the device.

Figure 3 is a view similar to Figure 1, the parts of the device in this instance being shown in the positions they occupy upon completion of a test.

Figure 4 is a longitudinal section taken along line 4—4 of Figure 1.

In the illustrated embodiment of the invention the parts of the device are carried by an arm 6. One end of the latter is suitably secured to the upper end of a standard 7 which is mounted upon a base 8, the said standard consisting of upper and lower sections 9 and 10, respectively, which are connected by a hinge 11 in such a manner that the upper section may be pivoted upon the lower section to swing the free end of the arm 6 upwardly with respect to the base 8 (see dotted line position shown in Figure 2). A vertically arranged shaft 12 is carried by the outer end of the arm 6. The said shaft is mounted for free rotation in suitable anti-friction bearings 13 which are carried in a tubular casing 14. The latter is arranged in an opening 15 which is formed in the arm 6 and is secured therein by a cap-piece 16 and screws 17. At its upper end the shaft 12 carries a disc 18, the said disc being suitably secured to a hub 19 which fits over the shaft 12 in such a manner that relative angular movement between the latter and the disc is prevented. At its lower end the shaft 12 carries an element 20. The latter is supported by the shaft 12 in such relation to the base 8 that when a receptacle 21 is properly arranged upon it the element 20 will be immersed in the fluid in the said receptacle.

Means is provided for imparting a rotative impulse to the disc 18. The said means includes an actuating spring 22. One end of the latter is fixed to a block 23 which is secured by suitable fastening means to the inner end of the arm 6.
The free end of the actuating spring carries a member 24 which is slotted as at 25 (Figure 4) to provide spaced legs 26. A roller 27 which is arranged in the slot 25 is carried by a pin 28 which is mounted between the legs 26. The parts are preferably so adjusted so that the spring 22 holds the member 24 against a stop 29. The latter is carried by a cross-piece 30 which is secured to the arm 6 and may, as illustrated, be provided with a cushioning strip 31.

The member 24 is adapted to be cocked by moving it against the action of the spring 22 to the position shown in Figures 1 and 4. As it is moved away from the stop 29 the legs 26 straddle the disc 18 and the roller 27 enters a radial slot 32 which is formed in the said disc. Entry of the roller into the slot is facilitated by initially adjusting the position of the disc so that the entrance of the slot is correctly located. After the roller enters the slot the member 24 and the disc 18 are moved simultaneously until the parts reach their cocked positions, the roller moving further into the slot during such movement of the said member and disc. The parts are held in their cocked positions by a trigger 33. The latter is pivotally mounted upon the cross-piece 30 and is formed or provided with a lateral projection 34 which is movable to enter the slot 32 behind the roller 27 and engage a wall of the said slot. The frictional engagement between the projection 34 and the wall of the slot serves to hold the trigger in its cocked position. Upon actuation of the trigger 33 to release the disc 18, the spring 22 is operative to return the member 24 to its normal position against the stop 29, a second stop 30a engaging the inner end of the trigger after it is released and preventing it from being so far that its outer end will engage the said disc. Throughout the greater part of the return movement of the member 24 the roller 27 is moving along one of the walls of the slot 32 and hence is rotating the disc about its axis. During the final part of the movement of the member 24 toward the stop 29, the roller 27 passes out of the slot 32 and comes to rest at a point beyond the periphery of the disc 18. The latter, under the impulse imparted to it by the actuating spring, continues to rotate until its inertia is overcome by friction and the resistance offered by the fluid in the receptacle 21 to the movement of the element 20. The actuating spring 22 is designed to apply substantially the same force to the disc 18 through substantially the same angular distance each time that the device is operated in the manner described. It will be apparent, therefore, that (the frictional resistance being the same in each case) the angular distance through which the disc moves by inertia will depend upon the resistance which is offered by the fluid in the receptacle 21, such distance increasing as the viscosity of the fluid decreases and decreasing as the viscosity of the fluid increases. In other words the magnitude of the angular movement of the element 20 is determined by, and is in accordance with, the viscosity of the fluid.

The upper face of the disc 18 may, as illustrated, be utilized as a dial, the graduations 35 thereof being inscribed around the edge of the disc from one edge of the slot 32 to the other and preferably representing viscosity units. A pointer 36 which is carried by the stop 29 is located adjacent the disc 18 and designates the particular graduation to be read.

In the use of the device, a quantity of the fluid to be tested is introduced into the receptacle 21 so that the element 20 is immersed in it. If the fluid is introduced into the receptacle before it is arranged upon the base 8 the entry of the element into the receptacle with facility can be insured by first breaking the standard 7 at the joint provided by the hinge 11 as best shown in dotted lines in Figure 2. After the receptacle has been arranged in the proper position upon the base 8 the upper section 9 of the standard is pivoted upon the lower section to return it to its normal position. During the final part of such movement the element 20 enters the receptacle and is submerged in the fluid contained therein. The parts are then cocked and released, as described, to impart a rotative impulse to the disc 18, and hence the element 20, it being understood that the disc 18 is of a substantial weight and acts in much the same manner as a flywheel. The friction between the moving parts remains at substantially a constant value. The angular distance through which the element 20 rotates before it is brought to rest by the resistance offered by the fluid in the receptacle 21 will, therefore, correspond to the viscosity of the fluid and will be indicated upon the dial. Preferably the device is designed in accordance with the characteristics of the particular kind of fluid to be tested and is available for the testing of such fluid through a substantial range of viscosities, it being understood, of course, that the angle through which the element 20 rotates may be less than 360° or more than 360° (that is to say the disc 18 may make less than a revolution or it may make a number of revolutions) and is dependent among other factors upon the strength of the actuating spring 22 and the weight of the disc 18.

The element 20 may be of any suitable shape. As shown, it is mounted in eccentric relation with respect to the axis of the shaft 12 so that one part 37 describes a path of greater diameter than the companion part 38. It will be noted also that the part 37 is offset with respect to the part 38, whereby a portion of the path of one of the said parts will be above the path produced by the other part. The construction described has the advantage that different parts of the element move in different paths, thereby insuring replacement of the fluid displaced by one of the parts before the said part again approaches the same angular position.

From the foregoing it will be apparent that a fluid can be tested accurately and with facility. If the fluid is heated, such as would be the case with melted chocolate, the testing operations can be performed rapidly enough to insure a reading which will not have to be corrected for temperature changes. A further advantage obtained is that those parts of the device which come in contact with the fluid being tested are readily accessible and can be cleaned without the necessity of removing any of them.

I claim as my invention:

1. A device for testing the viscosity of a fluid including means which is adapted to be immersed in said fluid, means for imparting motion to said first named means, whereby to cause it to move by inertia against the resistance offered by said fluid a distance determined by the viscosity of the fluid and means for indicating the viscosity which corresponds to the magnitude of movement of said first named means.

2. A device for testing the viscosity of a fluid including means which is adapted to be immersed in said fluid, means for imparting an impulse to said first named means, whereby to cause it to move against the resistance of said fluid a distance determined by the viscosity of the fluid and means for indicating the viscosity which corresponds to the magnitude of movement of said first named means.

3. A device for testing the viscosity of a fluid including an element which is adapted to be immersed in said fluid, means for mounting said element so that it is free to rotate, means for imparting a rotative impulse to said element, whereby to cause it to move by inertia against the resistance offered by said fluid a distance determined by the viscosity of the fluid and means for indicating the viscosity which corresponds to the magnitude of movement of said element.

4. A device for testing the viscosity of a fluid including an element which is adapted to be immersed in said fluid, means for mounting said element so that it is free to rotate, a spring for imparting a rotative impulse to said element, whereby to cause it to move by inertia against the resistance offered by said fluid a distance determined by the viscosity of the fluid and means for indicating the viscosity which corresponds to the magnitude of movement of said element.

5. A device for testing the viscosity of a fluid including an element which is adapted to be immersed in said fluid, a shaft to which said element is secured, said shaft being mounted for free rotation, a disc fixed to said shaft which acts as a flywheel, means for imparting a rotative impulse to said disc, whereby to cause said element to move against the resistance of said fluid a distance determined by the viscosity of the fluid and means for indicating the viscosity which corresponds to the magnitude of movement of said element.

6. A device for testing the viscosity of a fluid including an element which is adapted to be immersed in said fluid, a shaft to which said element is secured, said shaft being mounted for free rotation, a disc fixed to said shaft, means for imparting a rotative impulse to said disc, whereby to cause said element to move against the resistance of said fluid a distance determined by the viscosity of the fluid, one of the faces of said disc providing a dial which is graduated in viscosity units, and a pointer which co-operates with said dial to indicate the viscosity which corresponds to the magnitude of movement of said element.

7. A device for testing the viscosity of a fluid including an element which is adapted to be immersed in said fluid, a shaft to which said element is secured, said shaft being mounted for free rotation, a disc fixed to said shaft which acts as a flywheel, means for imparting a rotative impulse to said disc, whereby to cause said element to move against the resistance of said fluid a distance determined by the viscosity of the fluid, one of the faces of said disc providing a dial which is graduated in viscosity units and a pointer which co-operates with said dial to indicate the viscosity which corresponds to the magnitude of movement of said element.

8. A device for testing the viscosity of a fluid including an element which is adapted to be immersed in said fluid, a shaft to which said element is secured, said shaft being mounted for free rotation, a disc fixed to said shaft, a spring for imparting a rotative impulse to said disc, whereby to cause said element to move against the resistance of said fluid a distance determined by the viscosity of the fluid, one of the faces of said disc providing a dial which is graduated in viscosity units and a pointer which co-operates with said dial to indicate the viscosity which corresponds to the magnitude of movement of said element.

9. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, means carried by said spring for co-operating with said slot, said means being movable against the action of said actuating spring to a position in which it is located within said slot, said means being operative as it is released and returned to its original position by said actuating spring to impart a rotative impulse to said disc, whereby to cause said element to move against the resistance of said fluid a distance determined by the viscosity of the fluid and means for indicating the viscosity which corresponds to the magnitude of movement of said element.

10. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, means carried by said spring for co-operating with said slot, said means being movable against the action of said actuating spring to a position in which it is located within said slot, said means being operative as it is released and returned to its original position by said actuating spring to impart a rotative impulse to said disc, whereby to cause said element to move against the resistance of said fluid a distance determined by the viscosity of the fluid, one of the faces of said disc providing a dial which is graduated in viscosity units and a pointer which co-operates with said dial to indicate the viscosity which corresponds to the magnitude of movement of said element.

11. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, a roller carried by said spring for co-operating with said slot, said roller being movable against the action of said actuating spring to a position in which it is located within said slot, said roller being operative as it is released and returned to its original position by said actuating spring to impart a rotative impulse to said disc, whereby to cause said element to move against the resistance of said fluid a distance determined by the viscosity of the fluid and means for indicating the viscosity which corresponds to the magnitude of movement of said element.

12. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, means carried by said spring for co-operating with said slot, said means being caused to enter said slot as it is moved to a cocked position against the action of said actuating spring, means for holding said last named means in its cocked position, said holding means being operative to release said last named means and permit it to be returned to its original position by said actuating spring, said last named means imparting a rotative impulse to said disc as it returns to its original position, whereby to cause said element to move against the resistance of said fluid a distance determined by the viscosity of the fluid and means for indicating the viscosity which corresponds to the magnitude of movement of said element.

13. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, means carried by said spring for co-operating with said slot, said means being caused to enter said slot as it is moved to a cocked position against the action of said actuating spring, a trigger for holding said means in its cocked position, said trigger being operative to release said means and permit it to be returned to its original position by said actuating spring, said means imparting a rotative impulse to said disc as it returns to its original position, whereby to cause said element to move against the resistance of said fluid a distance determined by the viscosity of the fluid and means for indicating the viscosity which corresponds to the magnitude of movement of said element.

14. A device for testing the viscosity of a fluid including an element which is adapted to be immersed in said fluid, a shaft to which said element is secured, said shaft being mounted for free rotation, a disc fixed to said shaft, said disc being formed with a slot, an actuating spring, means carried by said spring for co-operating with said slot, said means being caused to enter said slot as it is moved to a cocked position against the action of said actuating spring, a trigger for holding said means in its cocked position, said trigger being operative to release said means and permit it to be returned to its original position by said actuating spring, said means imparting a rotative impulse to said disc as it returns to its original position, whereby to cause said element to move against the resistance of said fluid a distance determined by the viscosity of the fluid, one face of said disc providing a dial which is graduated in viscosity units and a pointer which co-operates with said dial to indicate the viscosity which corresponds to the magnitude of movement of said element.

GEORGE R. ECKSTEIN.